(12) United States Patent
Rodgers et al.

(10) Patent No.: US 6,351,215 B2
(45) Date of Patent: *Feb. 26, 2002

(54) MONITORING ANTENNA SYSTEM

(75) Inventors: James L. Rodgers, Mesa; Billy C. Fowler, Phoenix; Howard K. Jaecks, Mesa, all of AZ (US)

(73) Assignee: RF Code, Inc., Mesa, AZ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/233,755

(22) Filed: Jan. 20, 1999

Related U.S. Application Data

(63) Continuation-in-part of application No. 09/088,924, filed on Jun. 2, 1998.

(51) Int. Cl.⁷ .............................................. G08B 13/14
(52) U.S. Cl. ............................... 340/572.1; 340/572.7; 343/745; 343/748; 343/893; 343/894
(58) Field of Search .......................... 340/572.7, 572.1; 343/745, 748, 893, 894, 867, 866

(56) References Cited

U.S. PATENT DOCUMENTS

| | | | | |
|---|---|---|---|---|
| 4,201,960 A | | 5/1980 | Skutta et al. ............... | 333/17.3 |
| 4,486,722 A | | 12/1984 | Landt ......................... | 333/17.3 |
| 4,679,046 A | | 7/1987 | Curtis et al. .................. | 342/51 |
| 5,027,106 A | * | 6/1991 | Lizzi et al. ............... | 340/572.3 |
| 5,191,313 A | * | 3/1993 | Galbraith .................... | 340/501 |
| 5,226,167 A | | 7/1993 | Yamaguchi ................. | 332/107 |
| 5,274,392 A | * | 12/1993 | D'Hont et al. .............. | 343/866 |
| 5,348,008 A | | 9/1994 | Bornn et al. ................ | 600/301 |

(List continued on next page.)

FOREIGN PATENT DOCUMENTS

| | | |
|---|---|---|
| EP | 0 592 781 A1 | 4/1994 |
| EP | 0 789 253 A2 | 8/1997 |
| WO | WO 98/16070 | 4/1998 |

OTHER PUBLICATIONS

Escort Memory Systems Inc., Operator's Manual, "RS427 Read Only RFID Reader," Manual Revision 11, 8–00, Publication #17–1204, published on or before Mar. 1995, pp. 1–44.

Escort Memory Systems, Inc., Brochure, "RS427–Series Read Only Readers," published on or before Mar. 1995, pp. 99–102.

Primary Examiner—Daniel J. Wu
(74) Attorney, Agent, or Firm—William R. Bachand; Squire, Sanders & Dempsey L.L.P.

(57) ABSTRACT

A monitoring system incorporates antennas that transmit signals at predetermined frequencies; the transmitted signals are received by tags located in the active monitoring area of the antenna which then transmit signals back to the antenna. The antennas are tuned to each desired frequency prior to driving the antennas to transmit at the desired frequency. The system transmits a range of frequencies in a sequence that uses overlapping frequency steps. The monitoring system is also constructed having a variable configuration resulting in the ability to be reconfigured under program control to conform to varying system requirements. The integrated monitoring system employs programmable formats for reconfiguration such that upon program input from a host computer the system can assume predetermined configurations to conform to the particular tasks for the specific application. The monitoring system incorporates an antenna system that employs digitally controlled, differentially driven, scanning transceivers, and walk through magnetic induction antennas positionable in various configurations to maximize detection of tags being transported through the antenna system.

21 Claims, 10 Drawing Sheets

U.S. PATENT DOCUMENTS

| | | |
|---|---|---|
| 5,473,330 A | 12/1995 | Lauro et al. .................. 342/42 |
| 5,594,448 A | 1/1997 | d'Hont ........................ 342/44 |
| 5,600,304 A * | 2/1997 | Accolla et al. ........... 340/572.1 |
| 5,640,002 A | 6/1997 | Ruppert et al. ......... 235/462.46 |
| 5,686,902 A | 11/1997 | Reis et al. ............. 340/825.49 |
| 5,701,121 A | 12/1997 | Murdoch ............... 340/825.72 |
| 5,777,561 A | 7/1998 | Chieu et al. ............. 340/10.32 |
| 5,781,864 A | 7/1998 | Reudink ..................... 455/560 |
| 5,929,760 A | 7/1999 | Monahan ................. 340/572.7 |
| 5,952,922 A | 9/1999 | Shober ..................... 340/572.4 |
| 5,955,950 A * | 9/1999 | Gallagher, III et al. .. 340/572.1 |
| 6,005,532 A * | 12/1999 | Ng .............................. 343/867 |

* cited by examiner

MONITORING ANTENNA SYSTEM

RELATED APPLICATION

This application is a continuation-in-part of copending application Ser. No. 09/088,924 entitled MONITORING SYSTEM filed Jun. 2, 1998.

FIELD OF THE INVENTION

The present invention relates to monitoring systems that are used for the detection, identification, control or location of events and items such as the passage or presence of a merchandise tag or an employee identification badge tag, a conveyor belt with baggage having a tag, or a cart equipped with a license plate style tag in a hallway, and specifically relates to antenna systems forming a part of such monitoring systems.

BACKGROUND OF THE INVENTION

The utilization of monitoring systems such as tag systems that are designed for a specific purpose and application, such as the detection of a merchandise tag passing through a designated space adjacent to an exit, are well known. These systems typically incorporate discreet hardware architecture using analog techniques operating through the utilization of transmit and receive antennas positioned in close proximity to the control electronics operating the antennas. These systems are designed for the detection of a single type of event, such as the detection of a merchandise tag entering a designated area and are directed to a particular application having a predetermined surveillance area (e.g., adjacent an exit) for the detection of predetermined items (e.g., merchandise tags), and using a specific merchandise tag detection technique (e.g., frequency detection), and further using analog circuits and analog techniques for signal manipulation to provide an indication of the occurrence of the event. These specific designs, represent fixed configurations of systems for utilization with a particular application and are generally customized to fit that application. Antennas used in such prior art monitoring systems are typically pedestal type antenna positioned on either side of a doorway and are driven with conventional RF drivers to project an RF field through which an individual passes when entering the doorway. While there are many types of tags that are used in such prior art systems, one such type of tag is attached to merchandise and incorporates a resonant circuit connected to an antenna. Receipt of the RF field emanating from the pedestal antenna causes the tag circuit to oscillate and transmit a signal.

OBJECTS OF THE INVENTION

It is an object of the present invention to provide an antenna system for use in a monitoring system to facilitate the transmission and receipt of signals to and from a tag.

It is another object of the present invention to provide a high gain, differentially driven magnetic induction antenna for use in a monitoring system for the detection of a tag.

It is still another object of the present invention to provide an antenna that is digitally controlled and is both a transmit and a receive antenna.

It is still another object of the present invention to provide an antenna having a configuration to permit an individual to pass through the antenna while transporting a tag.

It is another object of the present invention to provide an antenna that permits the tracking of a tag in a two or three dimensional field to thereby permit the determination of tag position within the antenna's field.

It is another object of the present invention to provide an antenna system in a monitoring system wherein the antenna exhibits a high Q during a transmitting mode and a lower Q during a receiving mode.

It is still another object of the present invention to provide an antenna system wherein an antenna is driven at a frequency of a resonant circuit and wherein the resonant circuit is squelched to prevent ringing of the circuit and permit the antenna to receive.

These and other objects of the present invention will become apparent to those skilled in the art as the description thereof proceeds.

SUMMARY OF THE INVENTION

The present invention is an antenna system for use in an integrated monitoring system having multiple configurations that are selected under program control. A host computer dynamically provides commands and inputs selecting the particular configuration and scenario of operation that the system is to assume for particular tasks and applications. The system includes a system controller that responds to the configuration request from the host computer, or operates on internal programs and commands, and in turn communicates over a serial bus with distributed and remote antenna taps and/or other data input and output ports. The antenna taps include a tap controller that sends and receives commands and data from and to the system controller to actuate the antenna system for transmitting and receiving selected signals and for communicating received signals to the system controller for converting the signals to digital format, putting the results in a storage and into a digital signal processing system for correlation, scanning and other operations. The system may, under program control, be configured to detect and control tags and associated items or events as well as other data inputs and outputs through ports connected to the system controller or bus such as door openings, alarms, camera images, bar code readings and the like. The antennas are each driven and controlled by a respective antenna tap that provides differential driving and tuning for that antenna.

BRIEF DESCRIPTION OF THE DRAWINGS

The present invention may more readily be described by reference to the accompanying drawings in which.

DETAILED DESCRIPTION OF THE PREFERRED EMBODIMENT

Figure 1:
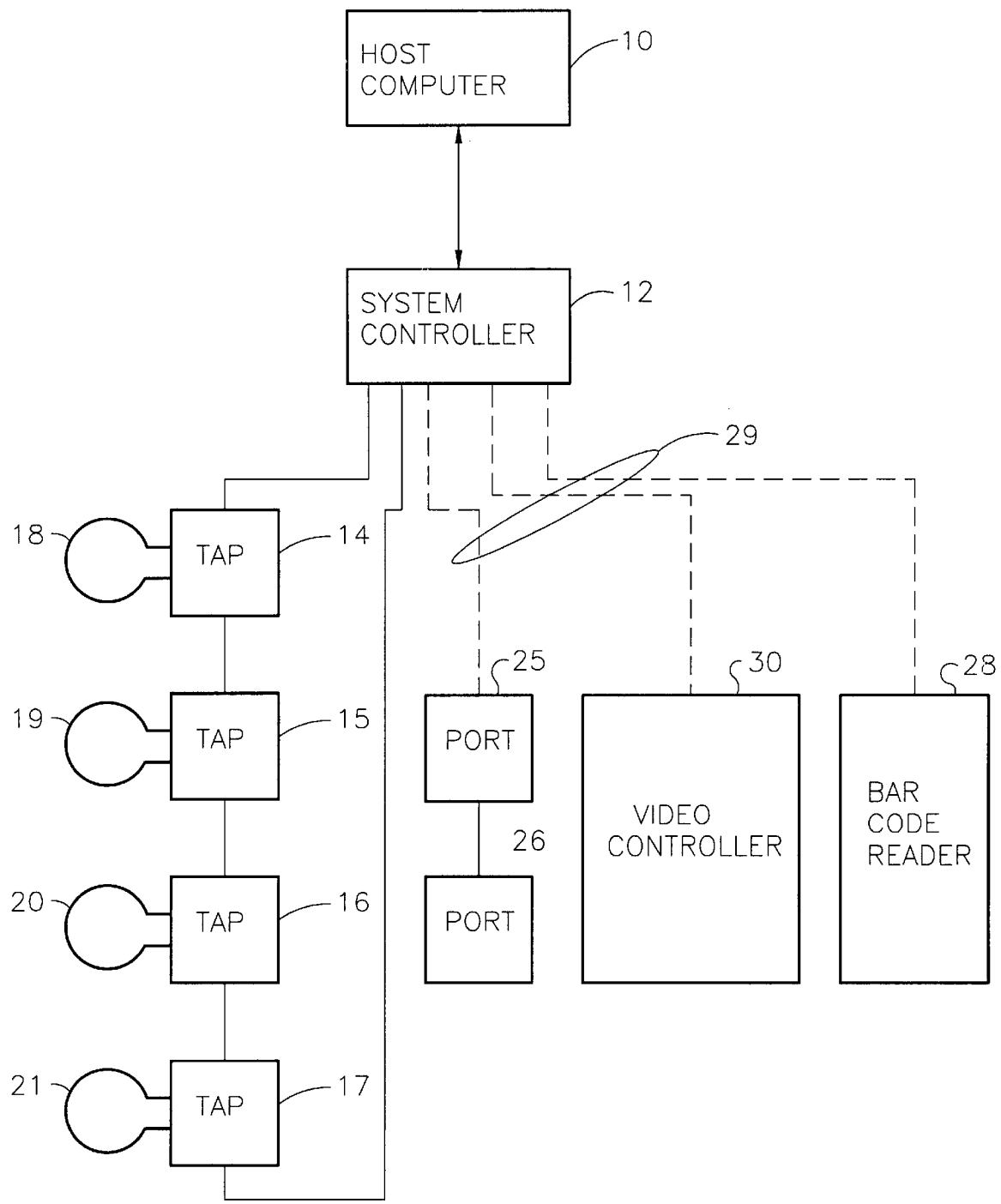
FIG. 1 is a simplified functional block diagram of a monitoring system constructed in accordance with the teachings of the present invention.

Referring now to FIG. 1, a simplified diagram of a monitoring system constructed in accordance with the teachings of the present invention is shown. A host computer 10 is provided for the overall control of the system; it may be noted, however, that a host computer may not be necessary and that the system controllers provide the necessary data and control signal processing for the system to operate. In most circumstances, however, a host computer will normally be utilized in the system and may already be available at the installation site. For example, in a commercial retail establishment it is normal for there to already be a multiple purpose computer on site that may already be using a common operating system that can readily be used to program control including system configuration designation. The host computer is connected to and communicates with a system controller 12 that provides the system control signals and data for communication to and from selected interfaces to provide a means for controlling the detection and monitoring of events. In the embodiment chosen for illustration, the system controller 12 enables the system to be configured or reconfigured into any of a number of system configurations. For example, the first configuration may provide for the connection of the system controller 12 to a plurality of taps 14–17, each of which performs control functions for a corresponding one of the antennas 18–21, respectively. These taps and antennas may, for example, be arranged for the detection of merchandise tags or employee is identification badges at designated locations throughout a facility.

Tags of the type utilized in the present system may be of the type known as frequency activated tags. That is, such tags will typically have a resonant circuit which, when excited by radiations of the chosen frequency, will resonate and retransmit a signal at its designated frequency. The tags usually incorporate one or more antenna in the form of a planar loop or spiral for receiving and/or sending signals. The tags must be small to permit attachment to merchandise or persons; such antenna loops are frequently formed on a supporting insulating surface. Such tags may be passive wherein no batteries or stored energy devices are present on the tag; alternatively, the tags could be active wherein batteries or other energy storage devices are mounted on the tag to supply energy for the subsequent transmission of signals. The system controller 12 permits any one or any combination of the taps to be activated to thus result in the detection of any designated event at the antennas' location. The taps are connected in series to the extent that any detected event results in a signal that may be passed directly to the system controller or may be passed to an adjacent tap where that detected signal may be combined or augmented with a signal from an event occurring at the receiving tap. This augmented or combined signal is then passed to the system controller.

An alternative configuration is shown that may be selected under program control wherein the previously described taps are activated to provide detection of the corresponding events while ports 25 and 26 are also activated for the detection of events of a different type. The connections for this alternative configuration are shown in broken lines 29. The ports 25 and 26 may be, for example, simple detection devices for detecting the opening or closing of a designated door in the facility. The doors may be entrances to restricted areas within the commercial establishment wherein access is restricted to employees having identification badges detected by one of the antenna of the reconfigured system.

Other system configurations include the activation of the above described ports in combination with a video controller 30 to provide surveillance in the event of the actuation of one of the ports. Similarly, the system may be reconfigured using the activation of a bar code reader system 28. It may be noted that the different systems resulting from the reconfiguration of the monitoring system of the present invention may incorporate combinations of elements in addition to the tag detection events occurring as a result of the incorporation of the taps 14–17 in the system. The different configurations of the system provide flexibility to enable the system to cope with varying demands of a single installation at the command of the facility operator. For example, the configuration of the system may be altered from a conventional commercial monitoring system for monitoring tags adjacent exits to a configuration intended primarily for after hours or weekend use wherein video surveillance and door openings become significant. Similarly, the system may be configured to facilitate the combined usage of conventional bar code reading systems with tag detection systems; the system may also be configured for use in inventory and production control by configuring the system to detect products (on a conveyor system for example) in a manufacturing facility while nevertheless providing the detection of events through the use of antenna connected through the taps to the system controller.

Figure 2:
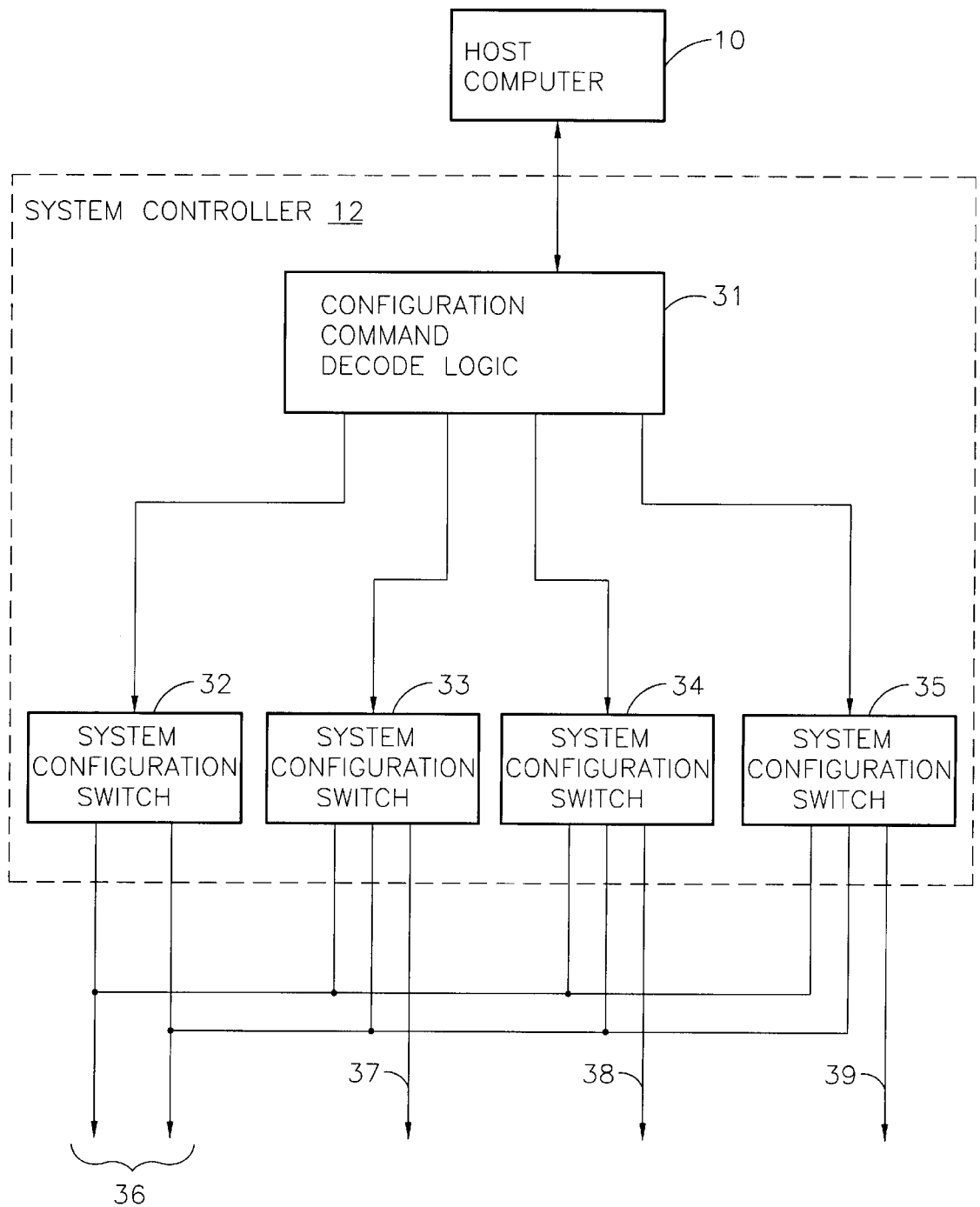
FIG. 2 is a schematic block diagram of a portion of FIG. 1 showing greater functional detail useful in the description of the present invention.

Referring to FIG. 2, the system controller 12 is shown connected to the host computer 10 and includes configuration command decode logic 31 connected to receive commands from the host 10. The configuration command decode logic 31 decodes the command from the host 10 and enables one of the system configuration switches 32, 33, 34, 35 each of which provides communication with a selected group of detection apparatus through corresponding cables or busses 36, 37, 38, or 39, respectively. Thus, if the host computer 10 issued a specific configuration command, the configuration command decode logic 31 would receive and decode the command and enable the appropriate system configuration switch 32–35 to thus enable the correct detection apparatus and configure the system to perform the detection task. The configuration may for example take the form of the system of FIG. 1 having the taps 14–17 and antenna 18–21 enabled in combination with the ports 25 and 26. The system is therefore reconfigurable under program control to meet the changing requirements of the facility.

Figure 3:
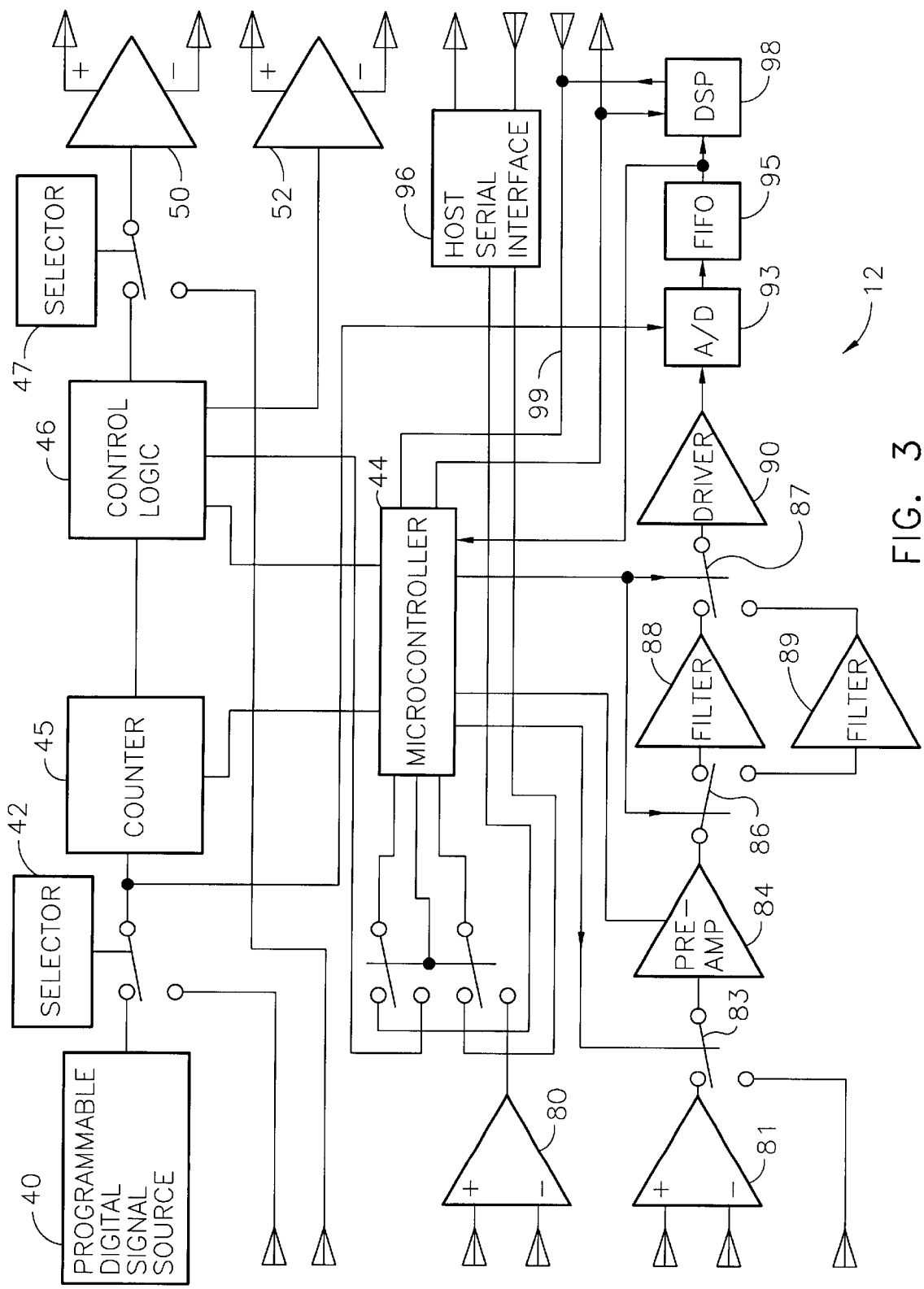
FIG. 3 is a schematic block diagram of a system controller used in the monitoring system of the present invention.

Referring now to FIG. 3, a system controller 12 is shown having a programmable digital signal source 40 that incorporates digital codes for the selection of any specific frequency and, in the present embodiment, provides the selection of frequency from about 3 megahertz up to approximately 50 megahertz. The signal source 40 is crystal controlled and is very stable; it further acts as the central signal source for creating the signals that are transmitted through an antenna to a receiving tag (to be described). A signal source selector 42 is connected to direct the signals from the programmable digital signal source and enables the selection of the programmable signal source 40 or other signal sources so that the system may operate under software and firmware control and may operate using signal sources such as those that may be desired at frequencies other than those provided by signal source 40. The signal source selector 42 operates under control from the system microcontroller 44.

A down counter 45 is provided and is connected by the signal source selector 42 to convert the signal, when connected to the programmable digital signal source 40, from 4x to 1x (x being the selected signal frequency to be used for the transmission of signals from the antenna to the tags). The 4x signal is used to activate the analog-to-digital converter (to be described) and the memory that processes the received tag signals; the 4x signal represents the taking of four samples for each cycle of the received signal from the tag.

Control logic 46 is provided to receive the signal from the down counter 45 and inputs from the microcontroller 44 and to synchronously create signals that are fed through switch 47 then through a cable to each tap. Switch 47 permits bus output transmitter 50 to be coupled to receive signals from either control logic 46 or an external signal source (e.g., for tap tests). The taps 14–17 (FIG. 1) drive the antennas 18–21; the control logic 46 creates an antenna bus output that is differentially driven by a differential bus output transmitter 50. The two wire output of the differential transmitter 50 is gated on during the times 70 that it is needed to turn on selected transmit antennas. The control logic 46 also outputs a digital code 72 through the differential transmitter 50; the digital code generally is transmitted before the output of the transmit signal through the differential transmitter 50. The digital code consists of an address word, followed by other words, with the address word selecting the particular tap that is to be activated. That is, while all of the taps will receive the address only that tap recognizing the preselected address word will be activated. The differential transmission technique helps extend the range at which the corresponding signal can be transmitted; it reduces EMI radiation and improves performance over long cable lengths. The differential output is transmitted over an eight wire cable of the type typically found in local area networks. The cable, or bus, is usually constructed of pairs of wires that are twisted with each pair twisted around each other and shielded with an external shield.

Figure 4:
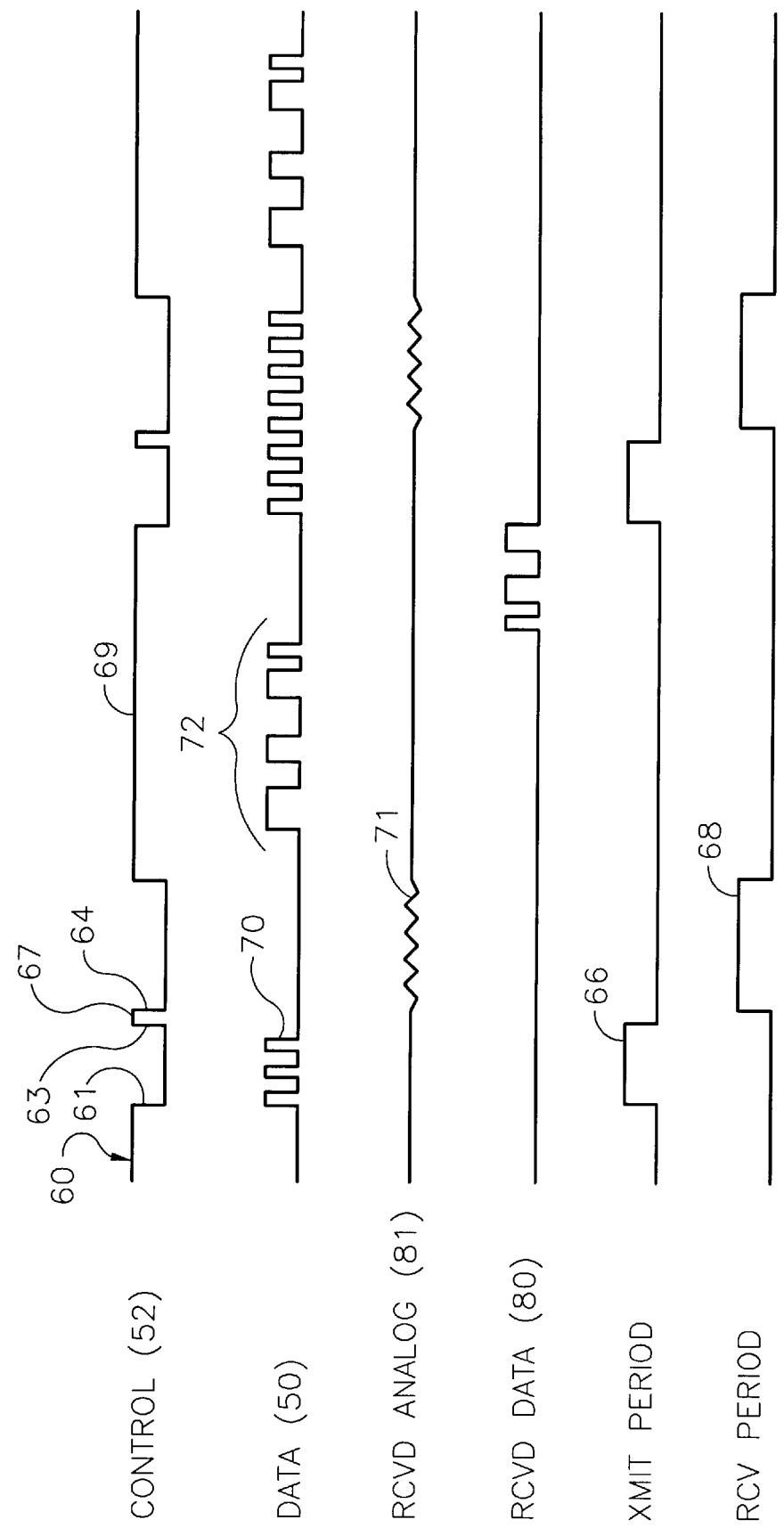
FIG. 4 is a timing diagram useful in the description of operation of the system of the present invention.

The signals from the control output 52 are also provided through the bus and provide signals that indicate to the addressed recipient of the control signal that the antenna connected to the addressed receiving tap is to be operated in the transmit mode, a squelch mode, or a receive mode. Referring to FIG. 4, at any time that the control out line signal 60 is high, the antenna is squelched to short out the antenna. When the signal is received by the tap, the first negative going edge 61 of the signal is interpreted as a transmit edge; when the signal reaches the positive going edge 63, it is interpreted as a squelch. The second negative going edge 64 is interpreted as a receive mode. The receiving taps receive this signal and break the components into a transmit period 66, a squelch period 67 and a receive period 68. The second line of the timing diagram of FIG. 4 represents the clock signal 70 occurring during the transmit period and is also used during a control period 69 to transmit a digital code 72 to select which tap is to be used as well as other information relating to the operation of the selected tap.

The lines from the differential transmitter 50 and control output 52 are essentially the main control from the system controller to the tap. All of the switching transitions are synchronized under the control of the digital signal source clock.

An antenna bus receive port 80 (FIG. 3) receives signals from the connected taps. This receive port is connected to the taps and receives digital signals therefrom to inform the system controller of the status of the tap. For example, the individual taps may be provided with a test is button that can be utilized for diagnostic or installation purposes which when activated will send a bit and a digital message to inform the system controller or the host computer that a test signal is desired at the tap. This provides a convenient means for testing the individual antenna and tap while the system operator is located at a remote position with the antenna. A second signal is received by the system controller at the antenna bus differential signal input 81; this latter signal is an analog signal and is actually the tag signal 71 (FIG. 4) that is received during the receive period and which is received at the taps from the respective antennas and are forwarded back to the system controller. This latter received signal is a differential analog signal. A receiver signal source selection switch 83 operating under the control of the system microcontroller 44 is provided and selects either the input from the bus connected to the tap or an external input from another source. The differential analog signal is applied to a preamplifier 84 that incorporates AGC. The AGC control lines permit the system microcontroller 44 to allow various levels of preamplification so that compensation can be made for different signal levels. The output from the preamplifier 84 with the AGC is connected to filter selector switches 86, 87 that allow the selection of one of two filters 88 and 89. The filters can be a high band filter and a low band filter, for example. The purpose of the filters is to provide Nyquist filtering to filter out harmonics of the input signals.

The output of the filter section is applied to a driver 90 for driving an analog-to-digital converter 93. The converter 93 is a high speed flash converter to convert the tag signals into eight or ten bit digital data signals. Thus, the received analog signal is filtered and then converted to digital code. The signal is sampled in the converter four times per cycle to prevent ambiguities; it may be noted that the analog-to-digital converter 93 is connected to receive the 4x signal from the programmable digital signal source 40. Thus, the system uses a sampling rate of four samplings per cycle; utilization of this sampling frequency assures that an output is always present even though Nyquist criteria indicates that it is only necessary to have only two samplings per cycle. The output data from the analog-to-digital converter 93 is applied directly to a FIFO memory 95. The memory 95 is connected to the system microcontroller 44 so that the system controller can communicate to the host computer and permit the host computer to perform signal processing there if desired. However, the present system incorporates a digital signal processor 98 to receive the output of the FIFO memory 95; the digital signal processor 98 performs digital filtering and provides a two byte output character representing the sum value of the center frequency of the signals that have come into the controller from a tag through the corresponding tap. If the frequency of the signal received from the tag matches exactly the frequency that the antenna was instructed to transmit, the received signal will be a maximum. The output of the digital signal processor 98 goes to a bus 99 to the system microcontroller which can then send it to the host computer through a host serial interface 96; further, the bus can also provide that information to other cards or interfaces to permit expansion of the system and provide additional reconfigurable structures.

Figure 5:
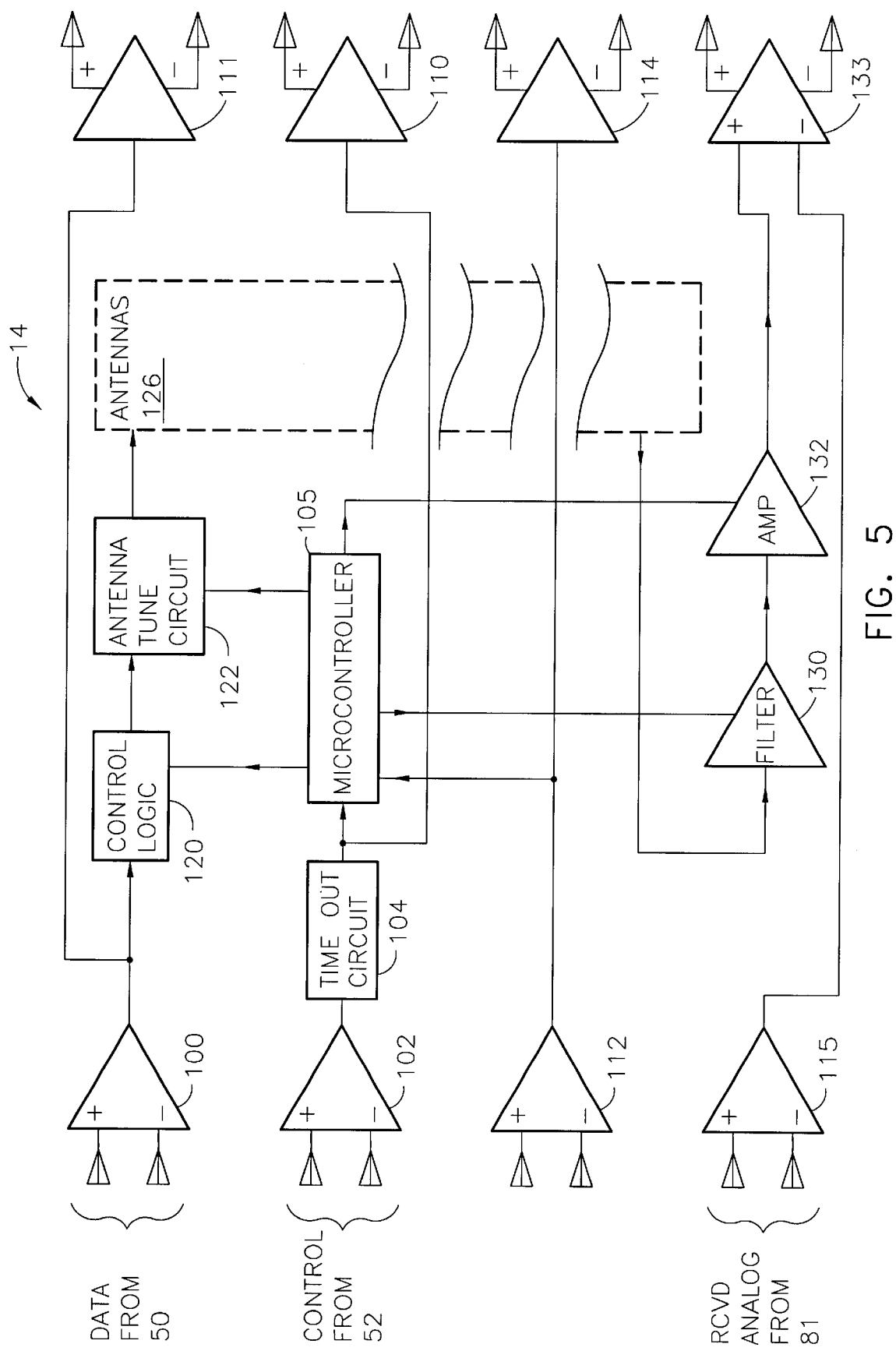
FIG. 5 is a schematic block diagram of an antenna tap used in the monitoring system of the present invention.

Referring now to FIG. 5, an antenna tap such as that shown at 14 in FIG. 1 is illustrated. A receive signal and data input 100 is provided for connection to the system controller to receive data and digital codes. This input receives digital input including digital address, control and data signals from the system controller including address codes (usually the first word in the digital message), turns on the selected tap, and interprets mode codes to place the tap in transmit only, receive only or transceiver operational conditions and also receives tuning control codes for tuning the antenna to a desired signal frequency. The data codes may also activate ancillary equipment such as an LED to indicate the active condition of the respective tap. A control input 102 receives digital input signals including transmit, squelch and timing control signals. When the input is held high for an extended period of time, time out circuit 104 acts to hardware reset the tap. The control input 102, in cooperation with the tap microcontroller 105 creates appropriate transmit on 66, squelch on 67 and receive on 68 (FIG. 4) outputs that operate the tap transmit, squelch and receive capabilities.

The time out circuit 104 is connected to the control input 102 to provide the automatic hardware reset when the control signal is held high for an extended period, thus indicating an error or malfunction necessitating a hardware reset. The control input 102 is also sent directly to the control output 110 for connection to a subsequent tap. Similarly, the receive signal and data input 100 signal information is also delivered directly to a signal and data transmitter output 111; tap digital data input 112 provides digital data to the tap microcontroller 105 but also provides information directly to the tap digital data output 114 for connection to a subsequent tap.

An analog input 115 receives differential analog signals from taps 15–17 upstream so that the input analog signal from the preceding tap may be added to, or supplemented by, the analog signal derived through the receiving tap 14. This feature permits two taps, for example, to be inputting information into the analog signal chain. For example, each tap has the ability to either put the data in a plus mode or a minus mode, plus phase or minus phase, and in this way can take the signal from each antenna and add it together or subtract it from each other. A typical implementation of this technique would be appropriate, for example, in a system using two antennas surrounding a hallway and separated by a predetermined distance. The signals from the antennas may be combined so that they are simultaneously subtracted from each other and any noise picked up by both antennas or any common mode signals are reduced or cancelled.

A tag coming into the active space of the antennas represents a very discreet transmitting source; the tag is a very localized source and therefore when it comes into the influence of one antenna it is still far away from the other. An input will thus be received from one antenna and nothing from the other. As the tag proceeds to a center zone between the two antennas, you again will get a cancellation of signals. As the tag (or the person or product to which the tag is attached) proceeds toward the second antenna, an output will be experienced therefrom but in opposite phase. It is thus possible to ascertain not only the detection of the event, or detection of the tag, but also follow the motion of the tag through the active area of the antennas. The antenna is differentially driven; that is, one end of the loop forming the antenna is connected to one terminal of a differential driver that is positive-going while the other end of the loop is connected to the negative-going terminal. The antenna is part of a resonant circuit that provides a resonant frequency when driven. The antenna is provided with a Q of from 10 to 40 giving a current gain. The quantity "Q" is a figure of merit normally attributed to resonant circuits and is equal to f1/f2 where f1 is the resonant frequency and f2 is the frequency band at 70.7% of maximum amplitude at the resonant frequency. The current in the antenna loop is a multiple of the current injected into the antenna by the signal sources. This means that the magnetic field is increased by the percentage of the current gain. The signal source during transmission is the corresponding driver, while the current source during the receive cycle is that signal received from a responding tag. Since the tag is loosely coupled (it is far from the antenna in terms of antenna-to-antenna positioning) it does not load the antenna loop.

Figure 9:
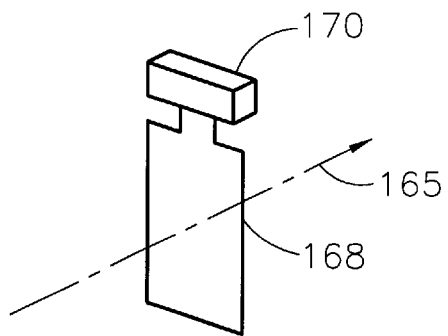
FIG. 9 is a schematic representation of a transverse walk through antenna constructed in accordance with the teachings of the present invention.

For example, if the differential driver provided a driving signal at a predetermined frequency having a peak-to-peak voltage from −10 volts at one terminal thereof to +10 volts at the other, the voltage is stepped up to 80 volts peak-to-peak through the action of the resonance. The current flowing through the antenna results in a magnetic field pattern that is "donut" shaped when the antenna is formed in a loop as shown in FIG. 9. The strength of the field in the center is strongest when located on a plane of the coil. The antenna can be made large enough to permit an individual to walk through the antenna in the direction shown by the arrow 165 with the bottom of the antenna buried in the floor. The strength of the field is thus strongest when the individual (who is either carrying or wearing the tag) is in the center of the coil, and weakens as the individual passes through the antenna.

The incoming control signals in combination with the tap microcontroller 105 and control logic 120 digitally switch on or off capacitors to tune the corresponding antenna to the selected frequency. The signals from the control logic 120 and the tap microcontroller 105 include information incorporating a frequency code designating a particular frequency at which the selected tap and antenna is to transmit. Antennas may be tuned to be driven at selected frequencies by varying the resonance of tuned circuits applied to drivers for driving the antennas. This can be done by varying a voltage variable capacitance or selecting different capacitance's across the antenna, selecting different points on the antenna loops or selecting a different number of loops of the antenna in order to vary the inductance, and therefore, the frequency of the antenna. The resonant frequency of tuned circuits in the preferred embodiment is changed by selecting or switching the capacitance across the antenna to thereby change the reactance of the circuit.

Figure 6:
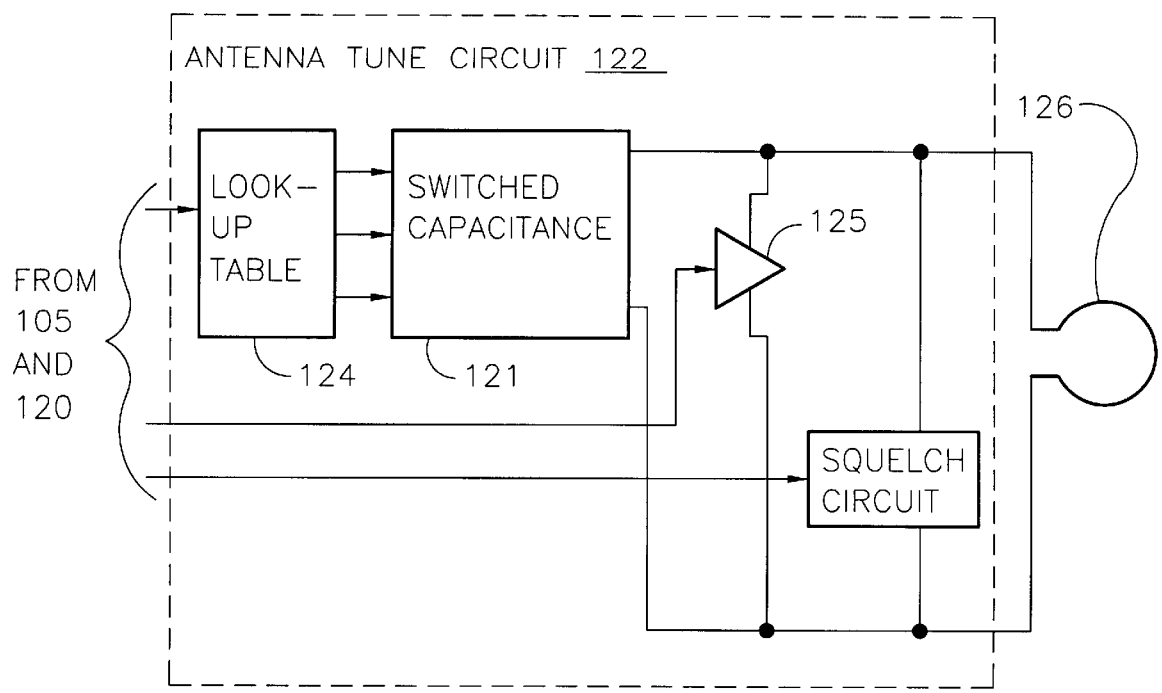
FIG. 6 is a block diagram of an antenna tuning arrangement used in the monitoring system of the present invention.

Referring to FIG. 6, an antenna tune circuit 122 is shown incorporating a tunable resonant circuit 121, the resonant frequency of which may be altered by switching into or out of the circuit incremental values of capacitance and/or inductance. The signals for inserting or removing these incremental values of reactance is derived from a look-up table 124 which is preloaded with switching configurations to be applied to the tuning circuit in response to received digital codes representing specific desired frequencies. Thus, if a particular frequency digital code is received by the look-up table 124, switching signals are applied to the tuning circuit 121 to selectively insert or remove incremental values of reactance from a tuned circuit to thus provide a frequency of the desired signal for application to a driver 125, or drivers, for driving an antenna 126. The diagram of FIG. 6 is a functional block diagram; it will be obvious to those skilled in the art that the look-up table can take any of several well known configurations; similarly, the tuning circuit and driver are conventional circuits readily familiar to those skilled in the art and may take several forms.

Returning now to FIG. 5, the antenna tune circuit 122 is connected to receive signals from the control logic 120 and the tap microcontroller 105 to select the requested frequency for application to an antenna driver 125 for driving an antenna 126. While the schematic illustration of FIG. 6 indicates a single antenna driver 125, two antenna drives are preferred to drive the antenna differentially to create maximum output with power sharing between the drivers and with opposite polarity voltages to minimize E Field radiation in contrast to the more conventional utilization of a balum coil.

The antenna 126 is typically a shielded cable with a high Q when transmitting; the transmission of the antenna must be squelched to instantaneously stop the transmission in order to permit the antenna to be used as a receive antenna. The cable may be formed using conventional shielded cable leaving the shielding ungrounded to reduce RF transmission; alternatively, the antenna may be formed with conventional insulated wire. The antenna is differentially driven. That is, each end of the antenna loop is driven with opposite polarity signals to provide a magnetic field resulting from the current flow in the loop. When used as a receive antenna the antenna has a lower Q in order to receive the weak and short tag signal. The Q change is accomplished by a Q controller circuit that imposes a high Q or low resistance on the resonant circuit when the voltage levels are high during transmission and a low Q or higher resistance when the signals are received tag signals that are very small. Signals received by the antenna from detected tags are applied to a filter 130, amplified 132 and applied to the analog output 133. This output may or may not be combined with the analog input 15 in a manner described above.

Figure 13:
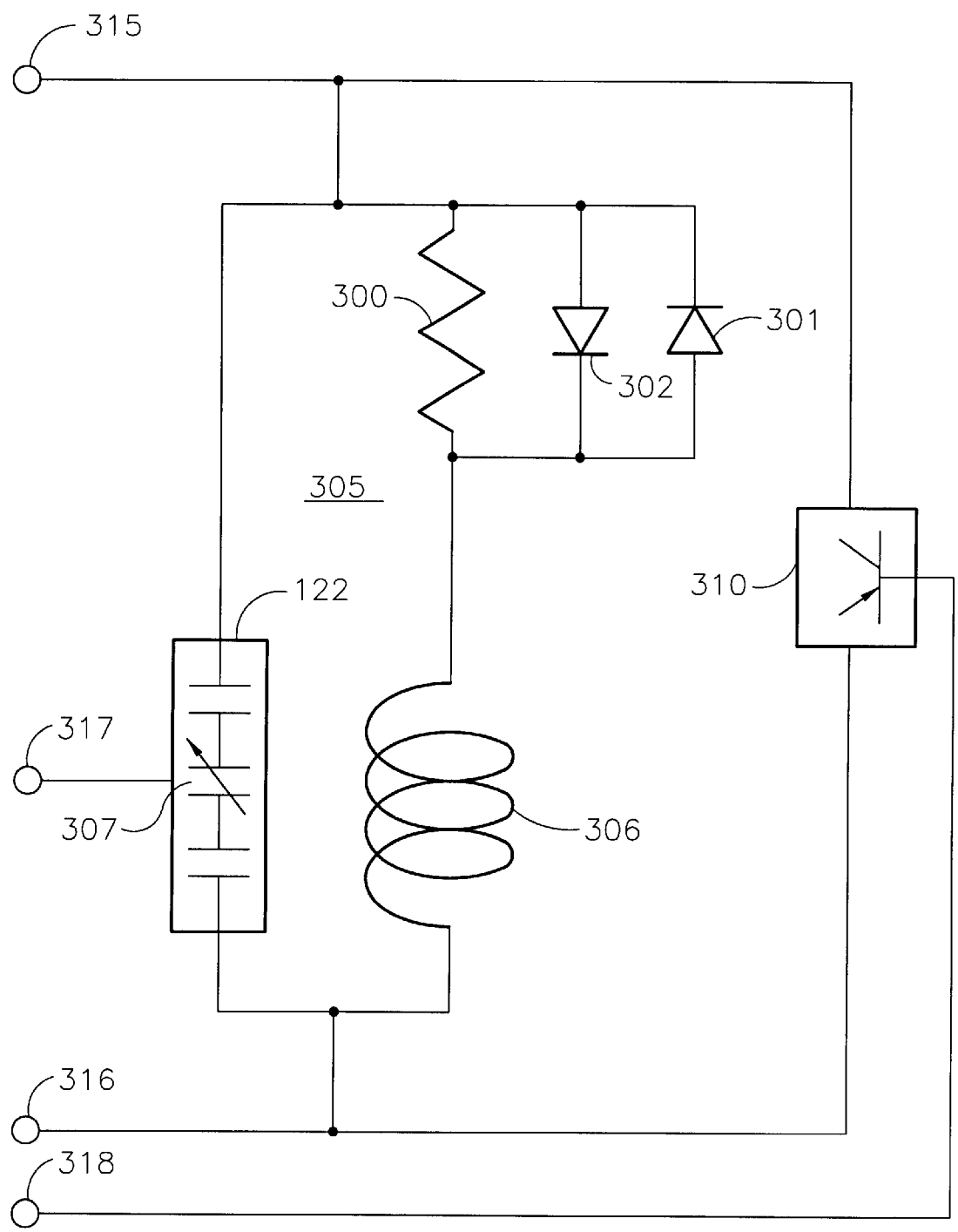
FIG. 13 is a simplified schematic diagram of a Q controller circuit utilized in the system of the present invention.

FIG. 13 shows a simplified schematic of a Q controller circuit. The Q controller circuit includes—a resistor 300, a pair of back-to-back connected diodes 301 and 302 across resistor 300, an inductor 306 in series with resistor 300 and a variable capacitance 307 connected across the series combination of resistor 300 and inductor 306, forming a parallel resonant circuit 307. The antenna loop 306 and the variable capacitance 307 correspond to the antenna 126 and antenna tune circuit 122 respectively of FIG. 6. A shorting circuit 310 is connected across the resonant circuit 305. Terminals 315 and 316 are connected to an antenna driver while terminal 317 receives a reactance modification signal to switch in or out incremental values of capacitance as schematically shown by the variable capacitance 307. Terminal 318 receives a squelch signal to close the shorting circuit 310 and thus short out the resonant circuit 305. The transmit, receive and squelch signal timing is shown in FIG. 4.

When the antenna is used to transmit, the transmitted signals are relatively large signals compared to the signals received from tags, the diodes 301 and 302 conduct and serve to short out the resistance 300 resulting in a low resistance high Q resonant circuit. The high Q of the tuned transmitting antenna means that the voltage and current to the antenna is greater or multiplied resulting in a larger amplitude magnetic signal output. However, having a high Q circuit for transmission is only possible because the antenna can be precisely tuned through the look up table for each frequency of operation. When the drive signal is turned off, the resonant circuit will attempt to continue to ring thus inhibiting the detection of incoming tag signals by the antenna (which is now acting as a receiving antenna). Therefore, when the transmit signal is turned off, the squelch signal is applied to terminal 318 to short out the resonant circuit 305 and prevent the circuit from ringing. The transmitting antenna is now ready to act as a receiving antenna.

When the antenna is used to receive signals it must have characteristics that will allow proper tag signal reception. The tags are energized by the receipt of signals transmitted by the antenna; these received signals cause the tags' resonant circuits to resonate. This short period of resonating requires any receiving antenna and following circuitry to have sufficient bandwidth to pass the short decaying signal transmitted by the energized tag. A high Q antenna configuration, such as that described above, would normally provide only a narrow bandwidth that would filter out the signal and prevent its reception. However, the received signals are generally in the millivolt levels and do not reach levels to cause the diodes 301 and 302 to conduct. Thus, resistor 300 is not shorted out and remains in series with the resonant circuit 305 causing the antenna Q to drop resulting in a much larger bandwidth as a receiver compared to the bandwidth when it is acting a transmitting antenna. The overall result is that large transmission signal amplitude results in high Q multiplication of the signal amplitude and low received signal amplitude results in a lower Q with sufficient bandwidth to pass the short receive signal. The Q controller circuit requires no external monitoring or control inputs to achieve the Q change function.

Returning to the timing diagram of FIG. 4, the control signal 60 is normally high; when the level of the signal drops, the negative going signal edge 61 indicates a transmit mode during which time the antenna should transmit. A clock signal 70 is shown, or a signal which is exactly synchronous with the chosen antenna frequency, is then transmitted by the antenna (which has been tuned to that frequency); the control signal then returns to the higher level to turn the squelch on. The control signal returns to the lower level to turn the receive mode on during which time any receive signal from the tap connected antenna will be received,such as the receiver signal 71. The control signal then returns to its higher level inhibiting any signals from the antenna and permitting the receipt of digital control code signals 72 such as frequency selection and the like.

During the time that the control signal is at its first lower level, the transmit signal is on; similarly, at the second lower level of the control signal the tap receive signal is on. In between the two lower levels of the control signal, that is the time 67 during which the signal returns to its higher level, the tap squelch signal is on. It is important to note that signals are not transmitted to (or received from) antenna except during the transmit mode (or during the receive mode). No signals are transmitted to the antenna during the receive mode and only receive signals are received from the antenna. During the squelch time the energy that was put into the transmit antenna is grounded or squelched to free the antenna and isolate all signals in the system to permit the antenna to solely detect signals coming from any tag.

Figure 7:
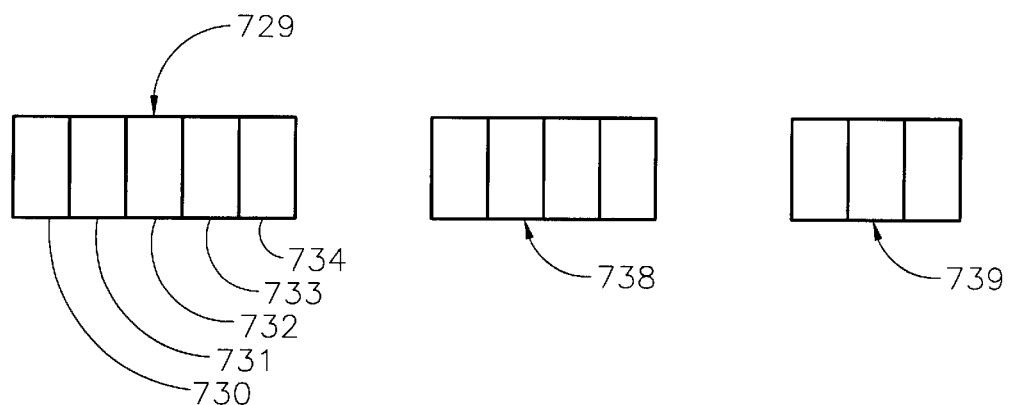
FIG. 7 is a schematic representation of a command word structure used in the monitoring system of the present invention.

The command structure used in the system of the present system incorporates a series of commands that permit the system to determine the several characteristics of the operation to be performed. Referring to FIG. 7, a sample command stream is shown. In the embodiment chosen for illustration, the command 729 is initiated with an ASCII character 730 to designate a command word to follow. The character is followed by four bytes 731–734 that provide commands to program the system. These four bytes (the system may use any convenient byte size although the system was chosen to use 8-bit bytes) select the tap to be addressed (and the antenna connected to the tap), the frequency that is to be transmitted by the antenna, the tuning code for the antenna to insure that the antenna is tuned to the chosen frequency, and the mode (transmit, receive). If for example the foregoing command were received and executed by the corresponding system controller, tap and antenna, and a reading of the results were made without an indication of the detection of a tag, a second command such as that shown at 738 would be sent. The second command would not have to contain all of the information sent by the first command since the tap is already selected; however, a new frequency would be chosen. If there were a detection, the command could simply be an instruction to read the results of the detection and thus could be very brief such as command word 739. Thus an abbreviated command would be sent with the new frequency and tuning code.

The above pattern of command sequence may not be required since the command sequence may be chosen to meet the demands of the particular application and the circumstances encountered after the transmission of the first command. If no tag is located in the active antenna area, a scan routine is implemented. Assuming that the nominal operating frequency of the antenna transmissions for the system is 3.3 MHz, the frequency spectrum from −600 KHz below to +600 KHz above that frequency is scanned in a selected number of steps. If the first frequency in the first sweep is frequency number zero, then the next frequency in the scan is frequency number 5, then 10, followed by 15 and so on until the first sweep is completed. A second sweep is then made with the first frequency being frequency 2 with the next frequency in this sweep being 6, then 11 etc. Subsequent sweeps are begun with a starting frequency indexed by one. In this manner, the entire frequency spectrum is scanned with an overlapping selection of frequencies.

The sweep technique assures that all frequencies in the range of selected frequencies are transmitted while no single frequency transmission contains so much energy that it may fail to comply with regulatory requirements. For example, 3.3 MHz has been chosen as the nominal frequency with the range of frequencies extending from −600 KHz to +600 KHZ on either side of the nominal frequency. To sweep this range, the range is divided into a plurality of N incremental frequencies (increments), and the sweep is then conducted by sweeping every fifth increment. If there is no tag detected, a second sweep is undertaken on every fifth increment with the beginning frequency indexed by one increment from the beginning frequency of the first sweep. Thus, the sweep comprises transmitting every xN frequency wherein "N" is the incremental frequency and "x" is an integer greater than one—in this case "five".

Figure 8:
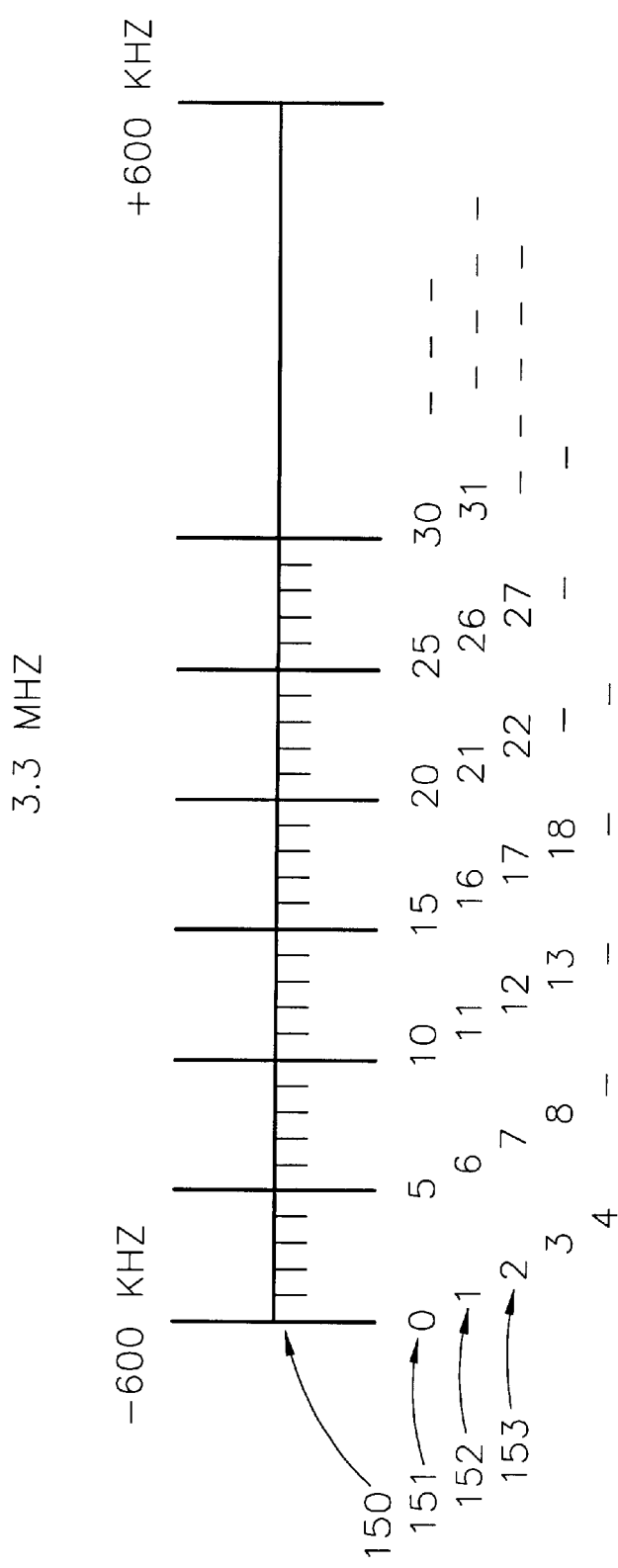
FIG. 8 is a schematic representation of a frequency spectrum useful in the description of the frequency sweeping technique used in the system of the present invention.

An illustration of this technique is shown in FIG. 8 wherein it may be seen that the nominal frequency 3.3 MHz has been divided into a plurality of incremental frequencies represented by the scale 150. The first sweep 151 is conducted by transmitting every fifth frequency beginning with the lowest frequency (the beginning frequency may be any of the designated incremental frequency—the lowest frequency is chosen for illustration). If no tag is detected, a second sweep 152 is conducted using every fifth frequency but indexing the beginning frequency by one. Thus, the first sweep is conducted by sweeping with frequencies 0, 5, 10, 15, 20, 25 . . . until the entire frequency range is completed. If no tag is detected, a second sweep is conducted by sweeping with frequencies 1, 6, 11, 16, 21, 26 . . . until the entire frequency range is completed. Again, a third sweep 153 would include frequencies 2, 7, 12, 17, 22 . . . until the entire frequency range is completed. Each sweep would begin with a frequency indexed by one from the beginning frequency of the preceding sweep. In this manner, the entire range is covered during the sweeping process without a concentration of energy in any frequency.

This scanning technique assures that all the frequencies in the band are scanned while the scan is completed rapidly. Further, and importantly, the repetition rate for each individual frequency is effectively only one fifth the repetition rate of the scan repetition rate. The reduced energy being transmitted at each frequency facilitates compliance with regulations limiting the radiation of signals in this frequency range as implemented by regulatory agencies such as the FCC.

The generation of the selected frequency for delivery to the antenna for transmission is the task of the programmable digital signal source that is located, in the embodiment chosen for illustration, in the system controller; however, the signal source may be placed in the host computer or even in the individual taps (if the taps can be otherwise synchronized). Similarly, the look up table need not be positioned in the individual taps and could be located in the system controller or the host computer.

Referring to FIG. 9, a schematic representation of a walk through, or portal, loop antenna 168 is shown. The antenna loop is formed in a plane as shown and is large enough to permit passage of a tag and its carrier through the loop. As used herein, the term "walk through" or "portal" means that an individual, wearing a tag or carrying merchandise having a tag attached thereto, may transport the tag through the loop of the antenna; however, the term also applies to other means of transporting the tag through the antenna loop. For example, the tag may be attached to a product that is being transported on a conveyer system, or on a factory vehicle. Under such circumstances, the antenna system of the present invention is formed with a loop sufficiently large to permit the tag and the carrier of the tag to pass through the antenna loop in the direction of the arrow 165. The tap 170 is positioned at the antenna site and in close proximity thereto; the tap is the interface/driver connecting the antenna to the remainder of the monitoring system. The antenna is digitally controlled as described above and forms a part of a tuned resonant circuit with an antenna loop Q of from 10 to 40. The antenna 168 is differentially driven through the tap 170 to transmit a predetermined digitally selected frequency. The driving signal is then turned off to permit the antenna loop to act as a receiving antenna; however, since the antenna is high Q, it continues to oscillate or ring. This ringing will interfere with the reception of the weak return signals from any tag in the vicinity of the antenna. To prevent this interference from occurring, the tuned circuit is shorted out to kill the residual current flow in the antenna and the field caused thereby. This squelch function may last for a time sufficient to insure the complete collapse of the field at which time the antenna is ready to receive any signal from a tap in the region of the antenna. The relationship of the relative timing of the transmit/squelch/receive modes is described above in connection with FIG. 4.

The loop antenna 168 may also be utilized as a transversal tag detection antenna. Any transversal positioning of the antenna orients the passage of the tag horizontally perpendicular to the direction indicated in FIG. 9 by the arrow 165. Such transversal positioning may be accomplished for example by placing the antenna loop in a plane perpendicular to a door opening wherein individuals carrying a tag would pass through the magnetic field of the antenna in a direction parallel to the plane of the antenna but in reasonably close proximity thereto. Similarly, the antenna may be positioned within a surface such as the floor or ceiling wherein a tag being carried passes through the magnetic field of the antenna in a direction parallel to the plane of the antenna. The latter positioning of the antenna may be most advantageously used in those circumstances such as conveyor systems or package transportation systems wherein tag carrying items are being transported over the floor or in close proximity thereto.

Figure 10:
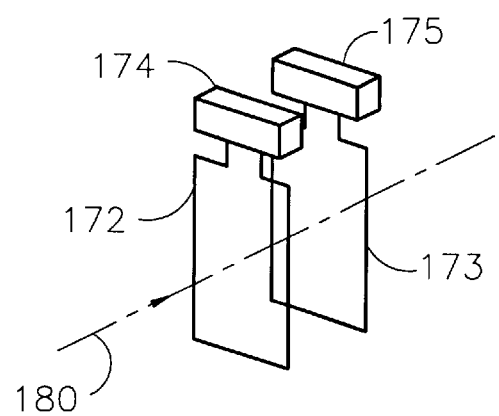
FIG. 10 is a schematic representation of two antennas positioned a predetermined distance apart and each driven by a corresponding differential driver wherein each of the drivers operates differentially with respect to the other.

When two antennas 172 and 173, each having a corresponding tap 174 and 175 respectively, are positioned a predetermined distance apart such as shown in FIG. 10 the range over which the system operates is increased. If the two antenna loops 172, 173 are driven in a differential mode with respect to each other, that is, the respective drivers 174, 175 are driving the corresponding antenna loops differentially with respect to each other, one of the antennas may be used to pick up noise and background noise to cancel the noise in the other antenna. For example, if the two antenna loops are spaced apart as shown in FIG. 10, then a tag approaching from the direction indicated by the arrow 180 reaches the first loop 172 first and injects little or no signal into the second loop 173. The system then adds the two loop signals (each loop antenna having opposite polarity by having their current flow in opposite directions); the noise and background noise that is common to both is then canceled. Since the tag signal is not common to both antenna loops it is therefore picked up by the respective antenna as the tag passes close to each to provide a signal indicative of the presence of the tag near the detecting antenna. In circumstances of FIG. 10, antenna 172 would first detect the tag while the second antenna 173 would provide the detection when the tag proceeds through the first loop to the second antenna loop 173.

Depending on antenna configuration and on tag position, it is possible that signals received by the tag from multiple antennas will add to provide additional signal strength; however, it is also possible for the signals to subtract (again, depending on the antenna configuration and tag position). For example, if the antennae of FIG. 10 each transmitted signals that were in phase or 180 degrees out of phase, it is possible that the signals, for some tag positions, will cancel each other resulting in no power transmission to the tag and no tag detection, or at least inconsistent operation of the detection procedure. It has been found that the signals transmitted from multiple antennas as in FIG. 10 may advantageously be phase shifted with respect to each other. That is, signals transmitted from antenna 172 are phase shifted ninety degrees from the signals being transmitted by antenna 173. The signals received by the tag will be added together to create a composite signal that will not go through zero although it will change phase depending on tag location. The amplitude of the received signal may also vary somewhat depending on tag position. The same properties of the signal are applicable to the signals transmitted from the tag; that is, the signals from the tag may be added together to form a composite signal with fairly constant amplitude with a varying phase.

Figure 11:
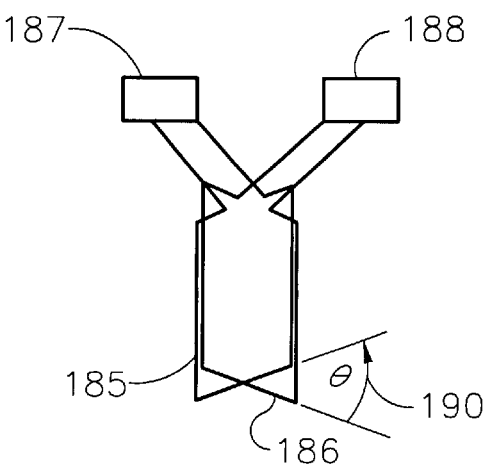
FIG. 11 is a schematic representation of two antennas positioned in an X pattern to provide certain advantages in the detection of tags.

To minimize the effects of tag antenna orientation, two or more transmit/receive antennas may be positioned in an X configuration as shown in FIG. 11. In the embodiment shown in FIG. 11, antenna 185 is oriented in a plane at an angle with respect to the plane of a second antenna 186. The antennas are each provided with a corresponding tap 187 and 188 respectively. The angle 190 between the antenna planes is forty-five degrees although other angles may be chosen. With the two antenna loops 185, 186 positioned at an angle with respect to each other, the angle of the tag's antenna loop is less likely to be positionable to create a null. That is, if the tag's loop antenna is in a plane perpendicular to the plane of a detecting transmit/receive antenna, it is possible that the signal strength of the field from the detecting and tag antenna will be oriented to militate against detection of the tag. However, providing an angle of forty-five degrees between the planes of the respective transmit/receive antenna loops has been found to provide excellent correction to the problem of tag orientation.

It is unlikely that a tag will be transported entirely through the antenna field without being positioned in other than an orthogonal position since the tag is moving (or being moved) in a three dimensional path through the antenna system field. However, to minimize the possibility of failing to detect a tag because of an orientation other than ideal (tag and sensing antenna loops in the same plane), the X configuration is desirable. Additional antennas may be used in the embodiment of FIG. 11 with their respective planes oriented at selected different angles to further avoid possible detection failure.

Figure 12:
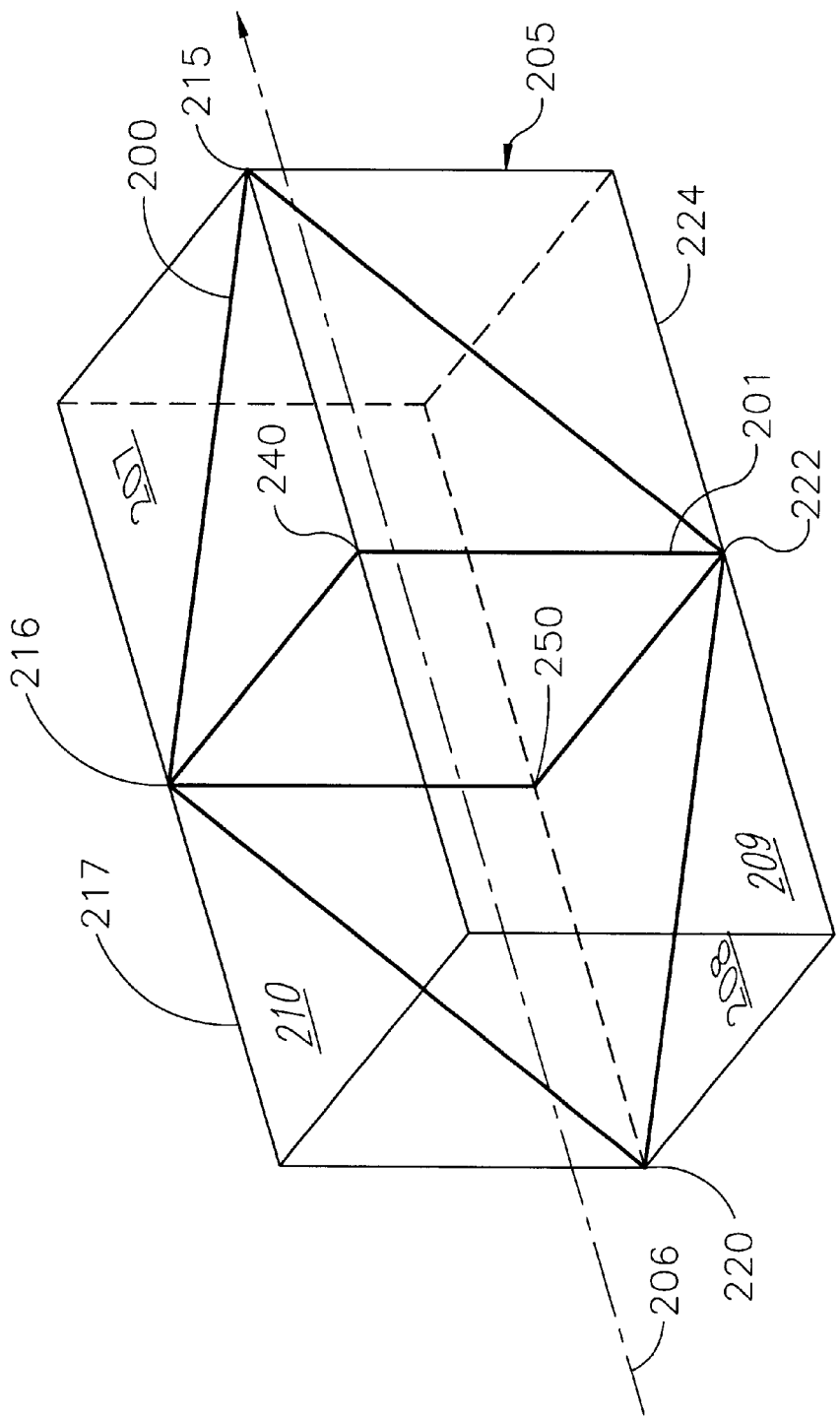
FIG. 12 is a schematic representation of a multiple antenna pattern using a three dimensional antenna plane orientation to maximize signal strength and minimize problems caused by tag antenna orientation.

To further avoid problems associated with tag loop and transmit/receive antenna orientation, two transmit/receive antennas 200 and 201, each having a corresponding tap (the taps are not shown in FIG. 12), may be positioned having a three dimensional angle of forty-five degrees between the respective antenna planes as shown in FIG. 12. Referring to FIG. 12, the positioning of the planes of the two antennas 200 and 201 (shown in FIG. 12 in heavy lines to facilitate description) may best be described by referring to a parallelepiped 205 having a top 207, bottom 208, front 209, and back 210 and having a length twice the height and a depth equal to the height. The ends of the parallelepiped are open to permit the transportation of a tag therethrough along the direction of the axis 206. The first antenna 200 may be visualized in a plane extending from a first corner 215 formed by the intersection of the top 207 and the front 209, to a point 216 bisecting the top back edge 217 of the back 210, to a second corner 220 formed by the intersection of the bottom 208 and the back 210, and a point 222 bisecting the bottom front edge 224 of the front 209. The second antenna 201 may be visualized in a plane extending from a third corner 240 formed by the intersection of the top 207 and front 209, to a point 216 bisecting the top back edge 217 of the back 210, to a fourth corner 250 formed by the intersection of the bottom 208 and back 210, and a point 222 bisecting the bottom front edge 224 of the front 209. If the sides of the parallelepiped are twice the length and the height, the planes of the antennas 200, 201 are at an angle of forty-five degrees with respect to each other. A tag being transported through the antennas along the direction of the axis 206 will form no more than a forty-five degree angle with respect to one or both antenna planes. That is, a planar loop antenna formed on a tag as described above will have the plane of its antenna form an angle with respect to the planes of the transmit/receive antennas 200, 201 of FIG. 12 that is no greater than forty-five degrees as it is transported through the antenna loops regardless of its orientation. The planes of the antennas 200 and 201 form an angle of forty-five degrees with respect to each other and with respect to the axis of the parallelepiped.

If we assume that a planar tag antenna generates a maximum detectable signal amplitude when its plane is parallel to the plane of a detecting antenna, and the amplitude is zero when the planes are perpendicular, the amplitude is then 70.7% of maximum when the two planes are forty-five degrees with respect to each other. If there are two detecting antennas positioned as shown in FIG. 12, and the greatest angle that can be formed between a detecting antenna plane and the tag antenna plane is forty-five degrees as described above, then the least signal amplitude to be detected as the tag passes through the antennas is 70.7%× 70.7%, or approximately 50%. Therefore, the maximum signal amplitude (100%) would be derived when the tag antenna plane is parallel to one of the detecting antennas' planes; however, since the tag antenna plane is a minimum of fortyfive degrees with respect to both detecting antennas' planes, the minimum signal strength is approximately 50%.

What is claimed is:

1. In a monitoring system for detecting the presence of a tag the improvement comprising:
   a digital signal source for generating digital signals representing selected frequencies;
   an antenna tap connected to said signal source for receiving said digital signals and generating an analog signal having a signal frequency of one of said selected frequencies; and
   a planar antenna loop connected to said antenna tap for transmitting signals at the signal frequency of said analog signal; wherein
   said antenna is responsive to signals from said tap for generating a magnetic field surrounding said loop at said analog signal frequency.

2. In a monitoring system for detecting the presence of a tag, the improvement comprising:
   a digital signal source for generating digital signals representing selected frequencies;
   an antenna tap connected to said signal source for receiving said digital signals and generating an analog signal having a signal frequency of one of said selected frequencies, said tap including differential antenna drivers; and
   a differentially drive planar antenna loop connected to said antenna drivers for transmitting signals at the signal frequency of said analog signal.

3. The combination set forth in claim 2 wherein said antenna is responsive to the analog signals from said drivers for generating a magnetic field surrounding said loop at said analog signal frequency.

4. In a monitoring system for detecting the presence of a tag, the improvement comprising:
   a digital signal source for generating digital signals representing selected frequencies;
   an antenna tap connected to said signal source for receiving said digital signals and generating an analog signal having a signal frequency of one of said selected frequencies; and
   a portal planar loop antenna connected to said antenna tap for transmitting signals at the signal frequency of said analog signal; wherein
   said antenna is responsive to the signals from said tap for generating a magnetic field surrounding said loop at said analog signal frequency; and
   said portal antenna has a magnetic field coupling to the tag in said magnetic field being transported through said loop.

5. The improvement set forth in claim 4 wherein said portal antenna is positioned and sized to permit tag carrying items to be transported perpendicularly through the plane of said antenna loop.

6. In a monitoring system for detecting the presence of a tag, the improvement comprising:
   a digital signal source for generating digital signals representing selected frequencies;
   an antenna tap connected to said signal source for receiving said digital signals and generating an analog signal having a signal frequency of one of said selected frequencies; and
   a transversal planar loop antenna connected to said antenna tap for transmitting signals at the signal frequency of said analog signal; wherein
   said antenna is responsive to signals from said tap for generating a magnetic field surrounding said loop at said analog signal frequency; and
   said transversal antenna has a magnetic field coupling to the tag in said magnetic field being transported adjacent said loop.

7. The improvement set forth in claim 6 wherein said transversal antenna is positioned and sized to permit tag carrying items to be transported through the magnetic field of said antenna parallel to the plane of said antenna loop.

8. In a monitoring system for detecting the presence of a tag the improvement comprising:
   a digital signal source for generating digital signals representing selected frequencies;
   a plurality of antenna taps connected to said signal source for receiving said digital signals and generating respective first and second analog signals each having a frequency corresponding to one of said selected frequencies;
   a first planar antenna loop connected to one of said antenna taps for transmitting signals at the signal frequency of the first analog signal; and
   a second planar antenna loop connected to another of said antenna taps for transmitting signals at the signal frequency of the second analog signal; wherein
   said first and second planar antenna loops are positioned in planes at an angle with respect to each other.

9. The improvement set forth in claim 8 wherein said planes intersect each other.

10. The improvement set forth in claim 8 wherein said antennas are portal antennas and said angle is about 45°.

11. The improvement set forth in claim 10 wherein the first planar antenna loop and the second planar antenna loop are formed around an axis; the first plane is perpendicular to the axis; and a line of intersection, between the second plane and a vertical plane that includes the axis, forms an angle of about 45° with the axis.

12. In a monitoring system for detecting the presence of a tag the improvement comprising;
   a digital signal source for generating digital signals representing selected frequencies;
   a plurality of antenna taps connected to said signal source for receiving said digital signals and generating respective first and second analog signals each having a frequency corresponding to one of said selected frequencies;
   a first portal planar antenna loop connected to one of said antenna taps for transmitting signals at the signal frequency of the first analog signal; and
   a second portal planar antenna loop connected to another of said antenna taps for transmitting signals at the signal frequency of the second analog signal; wherein said first and second portal planar antenna loops are positioned in parallel planes spaced along a path of the tag to be detected; and each of said antenna loops is driven differentially with respect to each other to cancel noise existing along said path.

13. In a monitoring system for detecting the presence of a tag, the improvement comprising:

a digital signal source for generating digital signals representing selected frequencies;

a first antenna tap and a second antenna tap each connected to said signal source for receiving said digital signals and generating analog signals each having a frequency correspondence to one of said selected frequencies; and a first planar antenna loop connected to said first antenna tap for transmitting signals at the signal frequency of the first analog signal; a second planar antenna loop connected to said second antenna tap for transmitting signals at the signal frequency of the second analog signal; wherein said first and second antenna taps drive said first and second planar antenna loops respectively with respective signals that are phase shifted with respect to each other.

14. The combination set forth in claim 13 wherein said phase shift is about 90°.

15. In a monitoring system for detecting the presence of a tag the improvement comprising:

a digital signal source for generating digital signals representing selected frequencies and for generating transmit mode signals and receive mode signals;

an antenna tap connected to said signal source for receiving said digital signals and said mode signals and generating an analog signal having a signal frequency of one of said selected frequencies; and a planar transceiver antenna loop connected to said antenna tap for transmitting signals at the signal frequencies of said analog signal and for receiving signals transmitted by the tag; wherein said antenna tap is connected to said planar transceiver antenna loop for receiving and amplifying tag signals detected by said antenna.

16. The combination set forth in claim 15 wherein said antenna is responsive to signals from said tap for generating a magnetic field surrounding said loop at said analog signal frequency.

17. The combination set forth in claim 15 wherein said antenna tap differentially drives said planar transceiver loop antenna.

18. In a monitoring system for detecting the presence of a tag, the improvement comprising:

a digital signal source for generating digital signals representing selected frequencies and for generating transmit mode signals and receive mode signals;

an antenna tap connected to said signal source for receiving said digital signals and mode signals and generating an analog signal having a signal frequency of one of said selected frequencies; and a planar portal transceiver loop antenna connected to said antenna tap for transmitting signals at the signal frequency of said analog signal and for receiving signals transmitted by the tag; wherein said portal planar transceiver loop antenna is responsive to signals from said tap for generating a magnetic field surrounding said loop at said analog signal frequency and is responsive to signals received from a tag; and said antenna tap is connected to said antenna for receiving and amplifying tag signals detected by said antenna.

19. In a monitoring system for detecting the presence of a tag, the improvement comprising:

a digital signal source for generating digital signals representing selected frequencies and for generating transmit mode signals and receive mode signals;

an antenna tap connected to said signal source for receiving said digital signals and said mode signals and generating an analog signal having a signal frequency of one of said selected frequencies; and a planar transceiver antenna loop connected to said antenna tap for transmitting signals at the signal frequency of said analog signal and for receiving signals transmitted by the tag; wherein said antenna tap responsive to said mode signals for selecting the reactance of a resonant circuit including said antenna; and said planar transceiver antenna loop has a higher Q during said transmit mode signal than during said receive mode signal.

20. In a monitoring system for detecting the presence of a tag, the improvement comprising:

a digital signal source for generating digital signals representing selected frequencies and for generating transmit mode signals, receive mode, signals, and squelch mode signals;

an antenna tap connected to said signal source for receiving said digital signals and mode signals and generating an analog signal having a signal frequency of one of said selected frequencies; and a planar transceiver loop antenna connected to said antenna tap for transmitting signals at the signal frequency of said analog signal and for receiving signals transmitted by the tag; wherein said antenna tap is responsive to said mode signals for selecting the reactance of a resonant circuit including said antenna and for squelching all transmissions in response to said squelch mode signal; and said planar transceiver antenna loop has a higher Q during said transmit mode signal than during said receive mode signal and being squelched during said squelch signal.

21. In a monitoring system for detecting the presence of a tag the improvement comprising:

a digital signal source for generating digital signals representing selected frequencies;

an antenna tap connected to said signal source for receiving said digital signals and generating an analog signal having a signal frequency of one of said selected frequencies;

a planar transceiver antenna loop connected to said antenna tap for transmitting signals at the signal frequency of said analog signal and for receiving signals transmitted by the tag; and a resonant circuit including said antenna; wherein said resonant circuit has a higher Q when said antenna is transmitting than when said antenna is receiving.

* * * * *